C. SELLERS.
Improvement in Mode of Transmitting Rotary Motion and Preventing Reaction.
No. 127,192. Patented May 28, 1872.
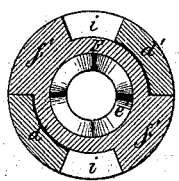
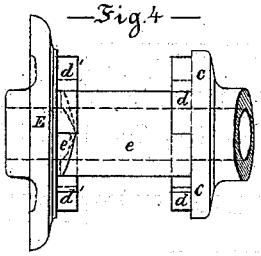
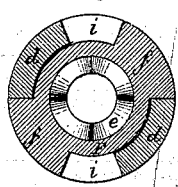
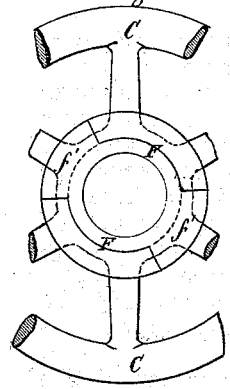
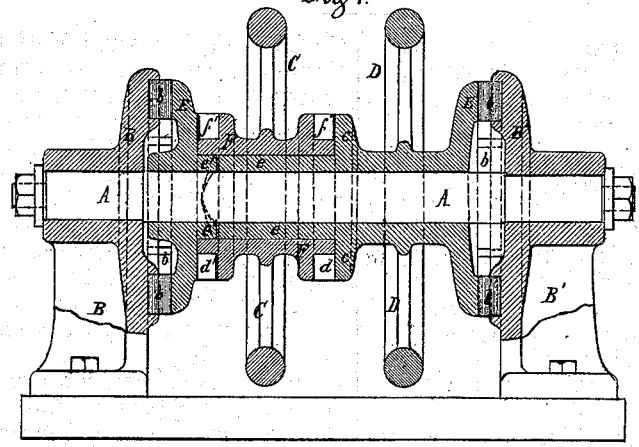
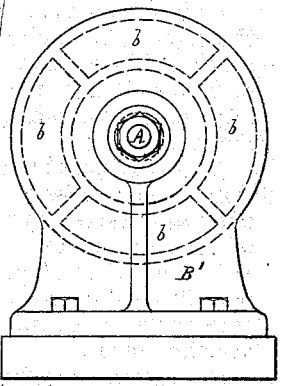
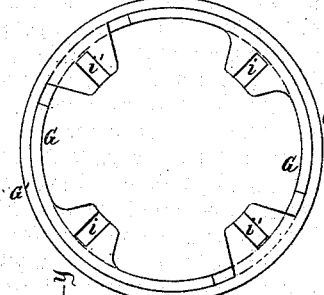
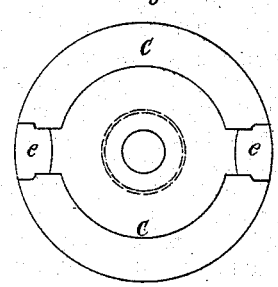
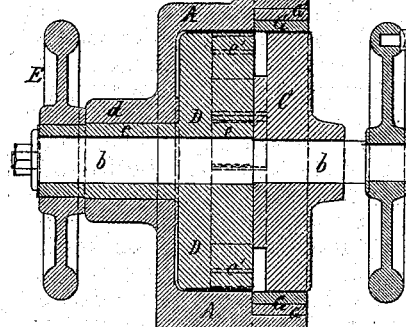
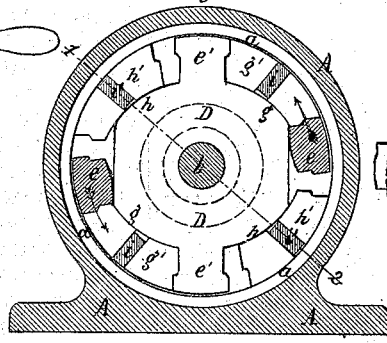
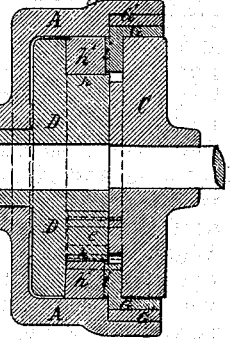

UNITED STATES PATENT OFFICE.

COLEMAN SELLERS, OF PHILADELPHIA, PENNSYLVANIA, ASSIGNOR TO WILLIAM SELLERS & CO., OF SAME PLACE.

IMPROVEMENT IN MODES OF TRANSMITTING ROTARY MOTION AND PREVENTING REACTION.

Specification forming part of Letters Patent No. 127,192, dated May 28, 1872.

*To all whom it may concern:*

Be it known that I, COLEMAN SELLERS, of the city of Philadelphia, in the State of Pennsylvania, have invented an Improved Mode of Transmitting Rotary Motion and Preventing Reaction, of which the following is a specification:

My invention is not confined in its application to one class of machinery only, but is adaptable as an improvement to various kinds of mechanism, and, therefore, its practical value and the importance of its purpose can only be fully appreciated after its precise nature and some of its most useful applications are explained.

My invention consists in a means of transmitting rotary motion from a driving power to the load in such a manner that the load cannot react on the driving power and propelling mechanism, when the latter ceases to act and while it remains in a state of rest, with this distinctive and peculiar feature, however, that any rotation of the driver in a reverse direction will continually set free the parts, checking the reaction of the load in such a manner as to allow the load to follow the driver as long as this reverse motion continues; but with the arrest of this reverse motion of the driver the liberation of the load will also cease without shock or reaction on the driving mechanism when coming to a state of rest. I attain this result by combining inclined planes and frictional surfaces, so arranged, in relation to each other and to the driving mechanism, that the rotation of the driver in the direction for moving the load shall eliminate the action of the inclined planes and frictional surfaces, and allow the driving motion to be transmitted to the load without other than ordinary frictional resistance of the bearings. When the driving power ceases to be applied the tendency of the load to move in the reverse direction and to react on the driving power brings the inclined planes into action as wedges, producing a powerful contact of moving frictional surfaces with stationary counter surfaces, thus arresting the reverse motion of the load, and preventing any reaction on the driving mechanism by frictional suspension of the load between the inclined planes and stationary surfaces. This suspension of the load and relative condition of the inclined planes and frictional surfaces continues as long as the driving power remains in a state of rest. The inclined planes are so arranged that any rotation of the driver in a reverse direction will actuate them so as to set free the frictional surfaces for the purpose of allowing the load to follow the driver as long as its reverse motion continues; but the arrest of this reverse motion renews the wedging action of the inclined planes on the frictional surfaces, thus again suspending the load and preventing its reaction on the driving mechanism.

The annexed drawing, forming part of this specification, represents two distinct modifications of my invention, differing mainly in the location of the inclined planes and frictional surfaces, and in the direction of their motion and action relative to the axis of rotation.

Figure 1 is a vertical longitudinal central section of a combination of mechanism whereby the wedging action of the inclined planes and pressure of the frictional surfaces are exerted endwise in the direction of the axis of the driving-shaft. Fig. 2 is an end view of Fig. 1. Figs. 3, 4, 5, and 6 are detached views of parts of this combination. Fig. 7 is a vertical longitudinal central section of a modified arrangement of my invention, whereby the inclined planes act in a radial direction from the axis of rotation against circular friction surfaces. Fig. 8 is a transverse section through the line $x\,y$, Fig. 7. Fig. 9 is a section at the line 1 2, Fig. 8. Figs. 10 and 11 are detached views of parts of this modification of my improvement.

In Fig. 1 the parts illustrating my invention are arranged upon a stationary horizontal shaft, A, supported at its ends in stands B B'. These stands carry also the stationary frictional surfaces, consisting of segments of wood, $b\,b$, forming annular planes on the opposite inner sides of the stands B B'. In order to avoid complication of parts not strictly belonging to my improvement, the driver or means of applying power is shown simply in the form of a balance-wheel, C, giving motion to a similar wheel, D, which represents the load. This driven wheel D has a long hub running loose on the shaft A, and terminating on the outside in an annular friction-disk, E',  conforming in size with the stationary frictional surface on the stand B'. The opposite side of the hub of the wheel D carries a flange or collar, c, provided with projections or carriers d d, and ends in a plain cylindrical sleeve, e, extending beyond these projections. E is a second movable friction-disk, running loose on the shaft A, and acting against a stationary frictional surface on the stand B. This disk E is also provided with projections d' d', actuated in combination with the carriers d d on the wheel D by projections f f and f' f' on the hub F of the driving-wheel C, which runs loose on the sleeve e and on the hub e' of the friction-disk E. The inclined planes acting on the frictional surfaces are formed on the contiguous end surfaces of e and e' in the manner clearly shown in the drawing. They consist of two pairs of planes inclining from the highest points in opposite directions, each plane occupying one-fourth of the whole circle. The carriers d d and d' d' are so placed relatively to the inclined planes that they shall stand directly opposite, their radial faces correctly in line with the axis of the shaft when the inclined planes are in full contact and the friction surfaces entirely released from end pressure. The projections d and f (or d' and f', respectively) do not fill the entire circle, but have a play or lost motion provided between them, as represented by the spaces i i in Figs. 5 and 6.

Assuming, now, C and the driver F to be rotated in either direction, the carriers f and f' will simultaneously bring up against the projections d and d' on E and E', and while driving the load D they will preserve the described inactive condition of the inclined planes and friction surfaces, and thus allow the driving motion to continue without frictional resistance due to these parts. When the driver C comes to a state of rest any tendency of the load to react on the driver by a motion of D in the opposite direction will disturb the relative position of the carriers d d d' d' and their inclined planes, and thus produce a sufficiently-powerful pressure of the movable frictional surfaces E and E' against the stationary surfaces e e to check and suspend the load. The wedging action of the inclined planes being thus exerted by the reaction of the load, is, therefore, only carried to the extent required for balancing the load, any given amount of load or reacting power producing its equivalent balancing pressure. The effect produced on these frictional surfaces and inclined planes by a motion of the driver C in the reverse direction will now be evident. The carriers d and d' on E and E' having changed their relative position by the sliding of the inclined planes upon each other, the projections on the driver will bring up against the nearest set of carriers d' d' on E, and by carrying this disk before them, the inclined planes on e' e' are continually withdrawn from under the contiguous surfaces e e. This sets free the frictional surfaces and allows the load thus liberated to follow the driver as long as its reverse motion continues; but as soon as this motion of the driver ceases the inclined planes renew their wedging action on the frictional surfaces and suspend the load in the described manner without reaction on the driving mechanism.

A modified arrangement of my invention is shown in Figs. 7 to 11 of the drawing. By this modification the inclined planes are made to act in a radial direction against an annular frictional surface, a a, in a casting, A, acting as a support for the movable parts. In Fig. 7 the balance-wheel B is the driver, giving motion to a driving-disk, C, which is fast on the driving-shaft b. This shaft runs loosely in the driven clutch D and hollow bearing c, which, in turn, is fitted into a bearing, d, in the stand A, in which it is free to revolve. The balance-wheel E, on the outer end of the sleeve c, represents the load or the part where a reacting force may be applied. e e are the driving-projections on the disk C, and e' e' are similar stops or projections on the driven disk D. g g and h h are eccentric surfaces provided in opposite pairs on the driven disk D, and engaging with wedges or blocks g' g' and h' h' of conforming inclination, the outer surfaces of which are fitted to the circle of the frictional surfaces a a in the stand A. These wedges occupy the spaces intervening between the driving and driven carriers e e and e' e', but are short enough to permit the play or lost motion required between the said carriers for the proper action of the inclined planes and frictional surfaces to suspend the load and to check its reaction. G and G' are rings revolving loosely in an annular recess in the stand A, and carrying on their inner sides the radial projections i i and i' i', which are equally divided in the circle, each pair, i i and i' i', being diametrically opposite each other, and, by filling accordant radial incisions in the cams, serve to keep the opposite cams in proper relative position, yet permitting i and i' to approach each other or recede. On reference to Fig. 8 the action of the whole may be readily explained as follows: Assuming the lugs e e of the driver to be revolving in the direction of the arrows, Fig. 8, this motion will be imparted to the disk D and load through the wedges g' g', which intervene between the driving and driven carriers e e and e' e'. In order to prevent undue frictional contact of these wedges with the stationary surface a a while the driving motion continues, the ends of these wedges have beveled surfaces interlocking with conforming bevels on the carriers e and e' in such a manner as to draw the wedges inward away from the frictional surface a a, as seen in Fig. 8. The other set of wedges h' h' is meanwhile kept suspended in their relative spaces by their lugs i' i' without any pressure from their inclined planes against the frictional surface a a, and therefore not resisting the transmission of the driving motion to the load.

When the driver ceases to move in the indicated direction the tendency of the load to move in the reverse direction and to react on the driving power will bring the eccentric surfaces $h\ h$ to bear on the wedges $h'\ h'$, and, by pressing them outward, will produce the required frictional resistance against the surface $a\ a$ to check and suspend the load. If the driving motion be now reversed the projections on the driver C will bring up against the small end of the wedges $h'\ h'$, and, by carrying these wedges before them, continually set free the frictional surfaces for the purpose of allowing the load to follow the driver as long as its reverse motion continues.

In both of the above-described illustrations of my improvement the inclined planes are provided in double sets, capable of acting alike in either direction of rotation, so that any tendency of the load or driven wheel to react on the driving mechanism will be checked in the described manner in either direction of motion; and the driving motion may be transmitted to the load in either direction with a like result.

As one of the important practical applications of this double-acting combination may be cited its use in steering apparatus for vessels, in which case the driving motion is reversed and arrested at short intervals, while the load is exerting a constantly-varying tendency to react in opposite directions. Now, by my improved mode of transmitting motion and preventing reaction, the rudder may be moved and held in any direction by the action of the driving power; but the rudder cannot change its position by the tendency to react on the driving mechanism, this reaction being checked in either direction by the frictional surfaces.

In both illustrations above given there will be a certain amount of back-lash between the action and reaction of the mechanism to the extent of the play or looseness of the wedging-surfaces. To obviate this springs may be so placed as to continually drive the wedging-surfaces home and thus make a continuous slight frictional resistance in turning, but holding the wedges in position to arrest reaction without lost motion of any appreciable extent. This principle may be most readily explained by Fig. 8.

The springs should be placed between $e'$ and $h'$ and between $e'$ and $g'$, tending to push the wedges $h'$ and $g'$ apart and toward the higher part of the inclined surfaces $h$ and $g$.

The described double-acting arrangement of my improvement is also applicable to certain kinds of hoisting machinery or cranes in which the loads are alternately raised by two ropes or chains wound around a drum in opposite directions; but for ordinary single-acting hoisting-machines, or in any case where the driving motion is always one way and the load tending to react only in the opposite direction, the inclined planes and clutches should each be arranged accordingly to act in their required directions.

I am aware that ratchet-wheels and pawls have been used in combination with inclined planes to arrest the reaction of the load by jamming it endwise between friction-surfaces, as in Thomas A. Weston's patent of August 28, 1868, wherein the load and the friction-disk are held from turning backward by the bringing up of a tooth in the ratchet against a stationary pawl; but this arrangement is dependent for the promptness of its action upon the length of the teeth in the ratchet, and brings up with a blow or jar of greater or less violence against the pawl, according to the distance the ratchet has to move until the pawl meets the tooth. This device is not, in its present form, adapted to an application of the power and suspension of the load in both directions, but would require two ratchets, with their teeth inclined in opposite directions, and a mechanism for reversing the pawl; or it would require two pawls and a means of alternately throwing one or the other into action.

I claim as my invention—

The improvement in the art of transmitting motion and preventing reaction on the driving mechanism by the combination of inclined planes, friction-surfaces, and carriers or projections on both the driving and driven surfaces, these parts being constructed to operate in combination, substantially as hereinbefore set forth.

In testimony whereof I have hereunto subscribed my name.

COLEMAN SELLERS.

Witnesses:
C. A. BARKER,
THEODORE BERGNER.